United States Patent [19]
Hunter

[11] 3,853,859
[45] Dec. 10, 1974

[54] NONFLUORESCENT, GREEN-YELLOW CATIONIC DYE

[75] Inventor: Frank Ray Hunter, Newark, Del.

[73] Assignee: E. I. du Pont de Nemours and Company, Wilmington, Del.

[22] Filed: May 14, 1973

[21] Appl. No.: 359,682

Related U.S. Application Data

[63] Continuation-in-part of Ser. No. 792,781, Jan. 21, 1969, abandoned.

[52] U.S. Cl. .............. 260/240.8, 8/54.2, 3/177 AB, 8/178 R, 8/179
[51] Int. Cl............................................. C09b 23/00
[58] Field of Search ................................. 260/240.8

[56] References Cited
UNITED STATES PATENTS

| | | | |
|---|---|---|---|
| 2,077,063 | 4/1937 | Wolff............................... | 260/240.8 |
| 2,089,633 | 8/1937 | Wolff et al....................... | 260/240.8 |
| 2,155,447 | 4/1939 | Roh et al. ........................ | 260/240.8 |
| 2,263,749 | 11/1941 | White et al. ..................... | 260/240.8 |
| 2,906,588 | 9/1959 | Brunkhorst, et al. ........ | 260/240.8 X |

Primary Examiner—John D. Randolph
Attorney, Agent, or Firm—James A. Costello

[57] ABSTRACT

A nonfluorescent green-yellow cationic dye having the formula:

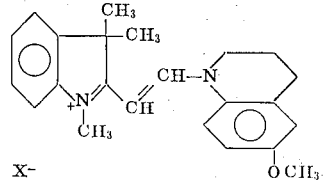

wherein X⁻ is one of a variety of anions.

2 Claims, No Drawings

NONFLUORESCENT, GREEN-YELLOW CATIONIC DYE

CROSS-REFERENCE TO RELATED APPLICATION

This is a continuation-in-part of copending Application Ser. No. 792,781, filed on Jan. 21, 1969, and now abandoned.

BACKGROUND OF THE INVENTION

1. Field of the Invention

The invention relates to a novel nonfluorescent, green-yellow cationic dye which is particularly useful in the dyeing of acid-modified acrylic, polyamide and polyester fibers.

2. Description of the Prior Art

An unsubstituted tinctorially weak analog of the dye disclosed herein is taught in U.S. Pat. No. 2,906,588. Its formula is

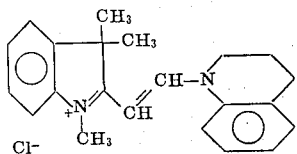

A tinctorially strong position isomer of the dye disclosed herein is taught in U.S. Pat. No. 2,155,447. Its formula is

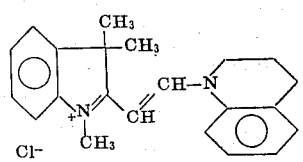

The properties of these prior art dyes compared to those of the dye of this invention will be discussed hereafter under the heading "Properties of the Novel Dye."

SUMMARY OF THE INVENTION

The present invention comprises a nonfluorescent green-yellow cationic dye of the formula

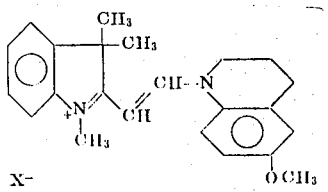

where $X^-$ is an anion such as chloride, bromide, iodide, sulfate, chlorate, phosphate, fluoroborate, picrate, acetate and arylsulfonate. It is preferred that $X^-$ be the chloride anion.

The process for preparing the novel dye comprises condensing 1,3,3-trimethyl-2-methylene indoline-omega-aldehyde with 1,2,3,4-tetrahydro-6-methoxyquinoline in equimolar amounts in a lower alkanol. A catalyst such as mineral acid or phosphorus oxychloride is then slowly added and the resultant precipitate is heated to redissolve. The desired dye is then reprecipitated by salting, cooled and dried.

DETAILS OF THE INVENTION

When a mineral acid catalyst is utilized in the preparation of the dye of this invention, it is added slowly to a solution of equimolar quantities of 1,3,3-trimethyl-1,2-methylene indoline-omega-aldehyde (Fischer's Aldehyde) and 1,2,3,4-tetrahydro-6-methoxyquinoline in a lower alkanol, preferably methanol, said solution containing up to about 45 percent by weight of solids. While the amount of mineral acid employed is not critical the ratio should be at least about 1 mole of mineral acid per mole of Fischer's Aldehyde and an excess of more than 2 mole of mineral acid per mole of Fischer's Aldehyde serves no beneficial purpose. While the particular mineral acid employed is not critical, hydrochloric acid is preferred. Sufficient solvent is used to maintain solubility, stirrability and ease of reaction. The reaction mixture is then agitated for 1–2 hours at a temperature of from 50°C. to the boiling point of the solvent used. Water is then added (about 60–70 percent by weight of the reaction mass) and this aqueous alcoholic mixture is heated to a temperature of from 60° C. to the boiling point of said aqueous alcoholic mixture. The dye is then precipitated by salting, cooled to 0°–15°C., and isolated by filtration.

Should the catalayst employed be phosphorous oxychloride, it is added slowly to a 15–35 percent solution of equimolar amounts of Fischer's Aldehyde and 1,2,3,4-tetrahydro-6-methoxyquinoline in an organic solvent containing about 5-15 percent of a lower alkanol, preferably methanol. While the amount of phosphorus oxychloride employed is not critical the ratio should be at least about 0.33 mole of phosphorus oxychloride per mole of Fischer's Aldehyde and an excess of more than 0.66 mole of phosphorus oxychloride per mole of Fischer's Aldehyde serves no beneficial purpose. Stirring is maintained throughout this mixing step and the temperature is kept below 35°C., since higher temperatures produce a red impurity which decreases the yield of desired product. For this reason the addition of the phosphorus oxychloride must be slow. The reaction mixture is then heated to 75°–80°C. to redissolve the precipitated product of said mixture. The desired dye is then reprecipitated by salting with an additive such as sodium chloride, cooled and isolated by filtration. This preparation can be effected in various organic solvents including benzene, monochlorobenzene, nitrobenzene, and the like, however xylene is preferred. Sufficient solvent is used to maintain solubility, stirrability and ease of reaction.

The anion may be varied depending on the physical form of the dye desired, some examples of possible anions being bromide, iodide, sulfate, chlorate, phosphate, fluoroborate, picrate, acetate and p-toluenesulfonate, with chloride being the preferred anion.

PROPERTIES OF THE NOVEL DYE

The novel dye of this invention is characterized by its tinctorial strength including good buildup and exhaust, lightfastness, and nonfluorescence. It is the lack of one or more of these characterizing features that serves to distinguish the analog of U.S. Pat. No. 2,906,588 and the isomer of U.S. Pat. No. 2,155,447, from the novel dye herein.

In comparison to the novel dye herein, the analog is tinctorially weaker to a significant degree and displays poorer exhaust and buildup while the isomer displays poorer lightfastness and is fluorescent. The importance of the property of lightfastness is understood clearly by those skilled in the art who also appreciate the conditions under which differences in lightfastness are most readily demonstrable.

The cationic dye of this invention is valuable for dyeing acid-modified acrylic and polyester fibers and has outstanding fastness to light on these fibers. It exhibits excellent reserve on wool, cotton and unmodified polyamide and polyester, rendering the dye useful for the coloration of various blend fabrics containing one or more of these fibers and an acid-modified fiber, and is also stable to heat. This heat stability is particularly important if the dye is to be used on carpeting, which is subjected to dry heat after dyeing to cure a latex backing. Further, the instant dye is resistant to hydrolysis and shows no shade change over the pH range 2–8.

The following Examples are intended to illustrate the invention and are not meant to limit the invention. Unless otherwise indicated, all quantities are by weight.

EXAMPLE 1

Preparation of the Dye Utilizing a Mineral Acid Catalyst

A solution of 10 parts of 1,2,3,4-tetrahydro-6-methoxyquinoline and 15.8 parts of Fischer's Aldehyde in 32 parts of methanol were warmed to 35°C. with stirring. 6.9 Parts of concentrated hydrochloric acid were added over 20 minutes at 35°–40°C. and the reaction mixture stirred for 1½ hours at 50°–55°C. 40 Parts of water were then added and the reaction mixture heated to 60°C. 15 Parts of sodium chloride were added and the reaction mass cooled to 10°–15°C., precipitating the dye. The product was filtered, washed with 160 parts of ice water and dried at 65°C.

The product thus obtained has the formula:

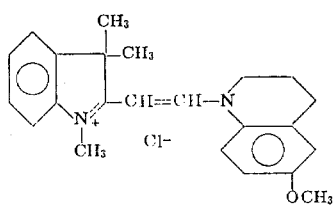

EXAMPLE 2

Preparation of the Dye Utilizing Phosphorus Oxychloride Catalyst

A solution of 555 parts of 1,2,3,4-tetrahydro-6-methoxyquinoline in 1450 parts of xylene and 220 parts of methanol is put into a vessel equipped with an external means of cooling. A nitrogen blanket is maintained in the vessel, to which is added 685 parts of dry Fischer's Aldehyde. The mass is cooled to 10°–15°C. and 190 parts of phosphorus oxychloride are added over 55–60 minutes, with agitation, the temperature being held below 35°C. The dye precipitates from solution on forming. The reaction mixture is stirred for 3 hours after addition of phosphorus oxychloride is complete at 35°C. or below.

3600 Parts of water are then added and the temperature raised to 80°C. to dissolve the dye. 230 Parts of salt are added and the solution cooled down to 15°–20°C. over at least 2 hours to reprecipitate the dye.

The product is filtered, washed with several cover washes of water which has been cooled to 5°C., and dried.

The dye obtained had the same structure and properties as that of Example 1.

EXAMPLE 3 (Utility)

Dyeing of Acid-Modified Acrylic Fiber

Preparation of Fiber

A 5-gram skein of acid-modified acrylic fiber was scoured for 15 minutes at 160°F. in a 200 ml. aqueous bath containing the following:

| | |
|---|---|
| tetrasodium pyrophosphate | 0.05 gram |
| the condensation product of 20 moles of ethylene oxide with one mole of $C_{18}$ alcohol | 0.03 gram. |

The skein was rinsed thoroughly with water.

Dyeing Procedure

A 200-ml. aqueous dyebath was prepared which contained the following:

| | |
|---|---|
| dye | 0.0075 gram |
| the condensation product of 20 moles of ethylene oxide with 1 mole of $C_{18}$ alcohol | 0.015 gram |
| sodium sulfate (anhydrous) | 0.500 gram |
| $C_{12-18}$ alkyl trimethylammonium bromide | 0.30 gram |
| glacial acetic acid | 0.050 gram |

The 5-gram skein was added and the temperature raised to boiling for 1–2 hours. The skein was rinsed in water, scoured for 15 minutes at 160°F. with 200 ml. of water containing 0.05 gram of the condensation product of 20 moles of ethylene oxide with 1 mole of $C_{18}$ alcohol, rinsed and dried.

EXAMPLE 4 (Utility)

Dyeing of Acid-Modified Nylon

Preparation of Fiber

A 5-gram skein of acid-modified nylon was scoured for 15 minutes at 160°F. in a 200 ml. aqueous bath containing

| | |
|---|---|
| sodium perborate | 0.20 gram |
| a sulfobetaine* | 0.006 gram |

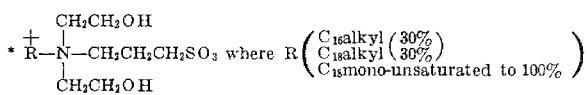

The skein was rinsed thoroughly in water.

Dyeing Procedure

The 5-gram skein was added to a 200-ml. aqueous dyebath containing:

| | |
|---|---|
| The aforementioned sulfobetaine | 0.050 gram |
| The tetrasodium salt of ethylenediamine tetraacetic acid | 0.013 gram |
| Tetrasodium pyrophosphate | 0.050 gram |

The dyebath pH was adjusted to 6 with monosodium phosphate and the temperature raised to 80°F. for 10 minutes. The dye (0.0075 gram) was added and the dyebath held at 80°F. for an additional 15 minutes. The temperature was then raised at a rate of 2°F. per minute to 208°F. This temperature was maintained for 1 hour. The skein was rinsed in water and dried.

EXAMPLE 5 (Utility) (Comparison)

The following reported data illustrated the unexpected lightfastness of the subject dye on acid-modified acrylic and nylon fibers in comparison with its art-known position isomer.

Subject Dye

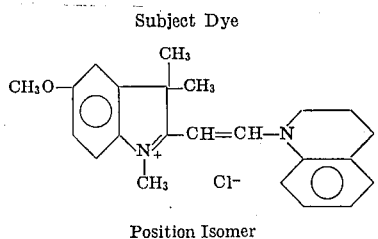

Position Isomer

The position isomer was prepared by the method of U.S. Pat. No. 2,077,063 and U.S. Pat. No. 2,155,447. After purification of both dyes by recrystallization from water, thin layer chromatography on silica gel-coated glass plates using methyl ethyl ketone/water (10:1) as eluent indicated that the dyes had comparable purity and equal $R_f$ values. The following data was also obtained:

|  | Subject Dye | Position Isomer |
|---|---|---|
| Nitrogen Analysis (iodide salts) | Found: 5.8% Calcd: 5.9% | Found: 6.0% Calcd: 5.9% |
| $\lambda$max | 420 | 420 |
| Absorptivity | 133 | 124 |

The two dyes were applied to acid-modified acrylic and nylon fibers at the 0.15 percent level (on the weight of the fiber) by the methods described in Examples 3 and 4 respectively and subjected to an Xenon Arc Fade-OMeter for 320 hours. Also noted below is the fluorescence of the isomer vs. the nonfluorescence of the novel dye taught herein, when viewed under ultraviolet light.

The following shade and strength results were assessed according to the Gray Scale as found in the Association of American Textile and Color Chemists Technical Manual. The Gray Scale chart showing degree of alteration in shade and strength is as follows:

5 Negligible or No Change
4 Slight Change
3 Noticeably Changed
2 Considerably Changed
1 Much Changed.

|  | Acid Modified Acrylic Fiber | Acid Modified Nylon Fiber | Fluorescence |
|---|---|---|---|
| Subject Dye | 4 dull, 4-3 weak | 4-3 weak | Nonfluorescent |
| Position Isomer | 3 dull, 2 weak | 1 weak | Fluorescent |

Thus, these data clearly demonstrate the unexpected superiority in lightfastness of the dye of this invention over the dye of the position isomer. That is, the shade remained brighter (significantly less dull) and the strength greater for the acrylic fiber dyed with the dye of this invention than for the acrylic fiber dyed with the isomer. The difference in strength between the nylon fiber dyed with the dye taught herein and the isomeric dye of the art is even greater and more significant.

EXAMPLE 6 (Comparison)

A comparison of fabric dyed with the unsubstituted analog vs. fabric dyed with the dye of this invention in addition to supporting the greater tinctorial strength of the dye herein vs. the analog, also supports the improved properties of dye buildup and exhaust for the novel dye herein vs. the art-disclosed analog.

The embodiments of the invention in which an exclusive property or privilege is claimed are defined as follows:

1. A nonfluorescent green-yellow cationic dye of the formula

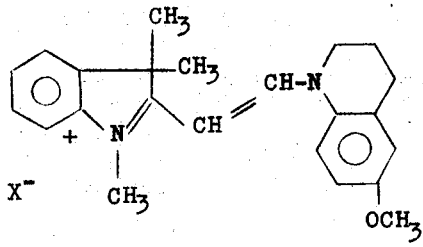

where $X^-$ is an anion selected from the group consisting of chloride, bromide, iodide, sulfate, chlorate, phosphate, fluoroborate, picrate, acetate and arylsulfonate.

2. A dye according to claim 1 wherein $X^-$ is a chloride anion.

* * * * *